US008718293B2

(12) United States Patent
Kim et al.

(10) Patent No.: US 8,718,293 B2
(45) Date of Patent: May 6, 2014

(54) SIGNAL SEPARATION SYSTEM AND METHOD FOR AUTOMATICALLY SELECTING THRESHOLD TO SEPARATE SOUND SOURCES

(75) Inventors: Chan Woo Kim, Goyang-si (KR); Ki Wan Eom, Suwon-si (KR); Jae Won Lee, Seoul (KR); Richard M. Stern, Pittsburgh, PA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 12/965,909

(22) Filed: Dec. 12, 2010

(65) Prior Publication Data

US 2011/0182437 A1 Jul. 28, 2011

(30) Foreign Application Priority Data

Jan. 28, 2010 (KR) ........................ 10-2010-0007751

(51) Int. Cl.
*H04R 3/02* (2006.01)
*G06F 17/00* (2006.01)

(52) U.S. Cl.
USPC ............................................ 381/73.1; 700/94

(58) Field of Classification Search
USPC .................. 381/71.1–71.14, 94.1–94.9, 73.1; 704/231, 233; 700/94
See application file for complete search history.

(56) References Cited

U.S. PATENT DOCUMENTS

| | | | |
|---|---|---|---|
| 6,098,040 | A | 8/2000 | Petroni et al. |
| 6,138,094 | A | 10/2000 | Miet et al. |
| 2004/0193411 | A1 | 9/2004 | Hui et al. |
| 2008/0167869 | A1 | 7/2008 | Nakadai et al. |

FOREIGN PATENT DOCUMENTS

| | | | |
|---|---|---|---|
| EP | 1748427 | A1 | 1/2007 |
| JP | 2004-289762 | A | 10/2004 |
| JP | 2008-257048 | A | 10/2008 |
| JP | 2009-86055 | A | 4/2009 |
| KR | 10-2005-0110790 | A | 11/2005 |
| KR | 10-2008-0009211 | A | 1/2008 |

OTHER PUBLICATIONS

Chanwoo Kim et Al. “Signal Separation for Robust Speech Recognition Based on Phase Difference Information Obtained in the frequency Domain” Interspeech 2009, Sep. 6, 2009.*
European Extended Search Report issued Nov. 16, 2012 in counterpart European Patent Application No. 11152295.9 (10 pages, in English).

(Continued)

*Primary Examiner* — Vivian Chin
*Assistant Examiner* — Ammar Hamid
(74) *Attorney, Agent, or Firm* — NSIP Law

(57) ABSTRACT

A signal separation system and a method for automatically selecting a threshold to separate sound sources. The signal separation system calculates a power sequence for a target signal using a target mask, and a power sequence for an interference signal using a complementary mask, based on signals received from a plurality of microphones; applies a nonlinearity to the target signal power sequence and the interference signal power sequence; calculates a correlation coefficient of the nonlinear target signal power sequence and the nonlinear interference signal power sequence; and sets a noise masking threshold that minimizes the correlation coefficient.

32 Claims, 6 Drawing Sheets

(56) References Cited

OTHER PUBLICATIONS

Kim, Chanwoo, et al. "Signal Separation for Robust Speech Recognition Based on Phase Difference Information Obtained in the Frequency Domain," Interspeech 2009, Sep. 6, 2009, pp. 2495-2498, XP55043337 (4 pages, in English).

Kim, Chanwoo, et al. "Automatic Selection of Thresholds for Signal Separation Algorithms Based on Interaural Delay," Interspeech 2010, Sep. 26, 2010, pp. 729-732, XP55043334 (4 pages, in English).

Baker, "The DRAGON System—An Overview," *IEEE Transactions on Acoustics, Speech, and Signal Processing*, vol. ASSP-23, No. 1, Feb. 1975, pp. 24-29.

Green, *An Introduction to Hearing*, 6th Edition, 1976, Chapter 11—Loudness, pp. 278-296, Lawrence Erlbaum Associates, Inc., Hillsdale, NJ.

Jelinek, "Continuous Speech Recognition by Statistical Methods," *Proceedings of the IEEE*, vol. 64, No. 4, Apr. 1976, pp. 532-556.

Moore et al., "A Revision of Zwicker's Loudness Model," *Acustica—Acta Acustica*, vol. 82, 1996, pp. 335-345.

Arabi et al., "Phase-Based Dual-Microphone Robust Speech Enhancement," *IEEE Transactions on Systems, Man, and Cybernetics—Part B: Cybernetics*, vol. 34, No. 4, Aug. 2004, pp. 1763-1773.

Halupka et al., "Real-Time Dual-Microphone Speech Enhancement using Field Programmable Gate Arrays," *Proceedings of the 2005 IEEE International Conference on Acoustics, Speech, and Signal Processing* (*ICASSP 2005*), May 9, 2005, vol. 5, pp. V-149-V152, conference held Mar. 18-23, 2005, Philadelphia, PA, paper presented Mar. 21, 2005.

Stern et al., "Binaural and Multiple-Microphone Signal Processing Motivated by Auditory Perception," *Proceedings of the 2008 Joint Workshop on Hands-Free Speech Communication and Microphone Arrays* (*HSCMA 2008*), Jun. 6, 2008, pp. 98-103, conference held May 6-8, 2008, Trento, Italy, paper presented May 7, 2008.

Park et al., "Spatial separation of speech signals using amplitude estimation based on interaural comparisons of zero-crossings," *Speech Communication*, vol. 51, No. 1, Jan. 2009, pp. 15-25.

Kim et al., "Signal Separation for Robust Speech Recognition Based on Phase Difference Information Obtained in the Frequency Domain," *Proceedings of 10th Annual Conference of the International Speech Communication Association* (*Interspeech 2009*), pp. 2495-2498, conference held Sep. 6-10, 2009, Brighton, UK, paper presented Sep. 7, 2009.

Kim et al., "Feature Extraction for Robust Speech Recognition using a Power-Law Nonlinearity and Power-Bias Subtraction," *Proceedings of 10th Annual Conference of the International Speech Communication Association* (*Interspeech 2009*), pp. 28-31, conference held Sep. 6-10, 2009, Brighton, UK, paper presented Sep. 10, 2009.

Kim et al., "Power Function-Based Power Distribution Normalization Algorithm for Robust Speech Recognition," *Proceedings of the 2009 IEEE Workshop on Automatic Speech Recognition & Understanding* (*ASRU 2009*), pp. 188-193, conference held Dec. 13-17, 2009, Merano, Italy, paper presented Dec. 14, 2009.

Kim et al., "Robust Speech Recognition using a Small Power Boosting Algorithm," *Proceedings of the 2009 IEEE Workshop on Automatic Speech Recognition & Understanding* (*ASRU 2009*), 2009, pp. 243-248, conference held Dec. 13-17, 2009, Merano, Italy, paper presented Dec. 14, 2009.

Kim et al. "Feature Extraction for Robust Speech Recognition Based on Maximizing the Sharpness of the Power Distribution and on Power Flooring," *Proceedings of the 2010 IEEE International Conference on Acoustics, Speech, and Signal Processing* (*ICASSP 2010*), Jun.28, 2010, pp. 4574-4577, conference held Mar. 14-19, 2010, Dallas, TX, paper presented Mar. 16, 2010.

Kim et al., "Automatic Selection of Thresholds for Signal Separation Algorithms Based on Interaural Delay," *Proceedings of the 11th Annual Conference of the International Speech Communication Association* (*Interspeech 2010*), 2010, pp. 729-732, conference held Sep. 26-30, 2010, Makuhari, Japan, paper presented Sep. 28, 2010.

* cited by examiner

SIGNAL SEPARATION SYSTEM AND METHOD FOR AUTOMATICALLY SELECTING THRESHOLD TO SEPARATE SOUND SOURCES

CROSS-REFERENCE TO RELATED APPLICATIONS

This application claims the benefit under 35 USC 119(a) of Korean Patent Application No. 10-2010-0007751 filed on Jan. 28, 2010, in the Korean Intellectual Property Office, the entire disclosure of which is incorporated herein by reference for all purposes.

BACKGROUND

1. Field

The following description relates to a signal separation system and a method for automatically selecting a threshold to separate sound sources.

2. Description of Related Art

Accuracy of speech recognition generally degrades in noisy environments even though the performance of speech recognition technology has been considerably improved. Thus, there is a demand to effectively solve a problem where the accuracy of speech recognition is reduced in speech recognition systems actually employed in consumer products.

Accordingly, there is a desire for a system and a method for effectively separating a target sound from interference sound sources.

SUMMARY

In one general aspect, a signal separation system includes a power sequence calculator to calculate a power sequence for a target signal using a target mask, and a power sequence for an interference signal using a complementary mask, based on signals received from a plurality of microphones; and a threshold setting unit to apply a nonlinearity to the target signal power sequence and the interference signal power sequence; calculate a correlation coefficient of the nonlinear target signal power sequence and the nonlinear interference signal power sequence; and set a noise masking threshold that minimizes the correlation coefficient.

The power sequence calculator may generate the target mask and the complementary mask based on at least one difference selected from an interaural time difference (ITD) of the received signals, an interaural phase difference (IPD) of the received signals, and an interaural intensity difference (IID) of the received signals.

The signal separation system may further include a difference calculator to apply a short-time Fourier transform (STFT) to each of the received signals; and calculate the at least one difference based on the STFT-transformed signals.

The threshold setting unit may calculate the correlation coefficient based on the nonlinear target signal power sequence, the nonlinear interference signal power sequence, and at least one difference selected from an interaural time difference (ITD) of the received signals, an interaural phase difference (IPD) of the received signals, and an interaural intensity difference (IID) of the received signals.

The threshold setting unit may set the at least one difference as the noise masking threshold that minimizes the correlation coefficient.

The nonlinearity may be a logarithmic nonlinearity or a power-law nonlinearity.

The target mask and the complementary mask may each be a binary mask or a continuous mask.

In another general aspect, a signal separation method includes calculating a power sequence for a target signal using a target mask, and a power sequence for an interference signal using a complementary mask, based on signals received from a plurality of microphones; applying a nonlinearity to the target signal power sequence and the interference signal power sequence; calculating a correlation coefficient of the nonlinear target signal power sequence and the nonlinear interference signal power sequence; and setting a noise masking threshold that minimizes the correlation coefficient.

In another general aspect, a signal separation system includes a masking unit to individually mask signals received from a plurality of microphones using a target mask and a complementary mask, and a threshold setting unit to set a noise masking threshold that minimizes a correlation between the masked signals.

In another general aspect, a signal separation method includes individually masking signals received from a plurality of microphones using a target mask and a complementary mask; and setting a noise masking threshold that minimizes a correlation between the masked signals.

In another general aspect, a signal separation system includes a masked spectrum generator to generate a masked target signal spectrum and a masked interference signal spectrum from signals received from a plurality of microphones using a target mask and a complementary mask; and a threshold setting unit to set a threshold of the target mask and the complementary mask based on a difference between the received signals so that the threshold minimizes a correlation between a nonlinearized target power sequence of the masked target signal spectrum and a nonlinearized interference power sequence of the masked interference signal spectrum.

In another general aspect, a signal separation method includes generating a masked target signal spectrum and a masked interference signal spectrum from signals received from a plurality of microphones using a target mask and a complementary mask; and setting a threshold of the target mask and the complementary mask based on a difference between the received signals so that the threshold minimizes a correlation between a nonlinearized target power sequence of the masked target signal spectrum and a nonlinearized interference power sequence of the masked interference signal spectrum.

Other features and aspects will be apparent from the following detailed description, the drawings, and the claims.

Figure 1:
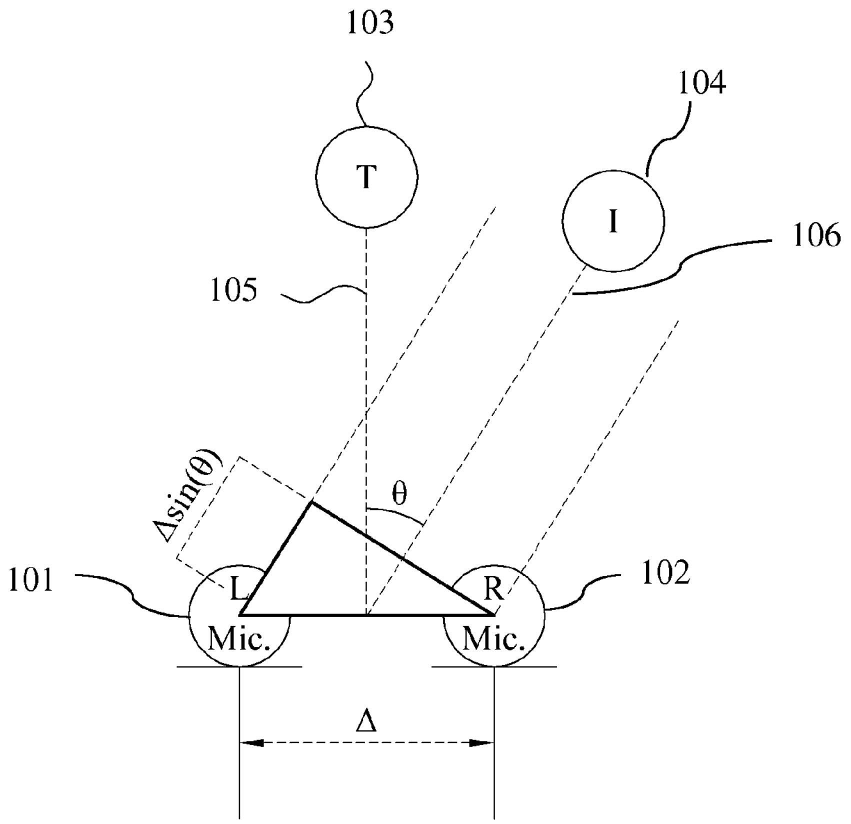
FIG. 1 shows an example of a left microphone, a right microphone, a target sound source, and an interference sound source.

Throughout the drawings and the detailed description, unless otherwise indicated, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and/or equivalents of the methods, apparatuses, and/or systems described herein will be suggested to those of ordinary skill in the art. Also, descriptions of well-known functions and constructions may be omitted for increased clarity and conciseness.

The human binaural system has the ability to separate a desired sound even in noisy environments where a variety of sounds are mixed. This is sometimes referred to as the binaural cocktail party effect.

In techniques used for separation of sounds, sounds may be separated based on a unique frequency for each sound, information on a direction from which a sound comes, and an auditory characteristic for masking sounds other than a desired sound.

Various methods of separating signals based on information on a sound generation direction have been developed using an interaural time difference (ITD), an interaural phase difference (IPD), and an interaural intensity difference (IID). The interaural intensity difference (IID) is also known as an interaural level difference (ILD). Phase information may be widely used in binaural processing since it is easy to acquire the phase information through frequency analysis.

In many algorithms based on the techniques described above, a binary masking scheme or a continuous masking scheme may be used to select a time-frequency bin dominated by a target sound source. The continuous masking scheme typically exhibits a superior performance compared to the binary masking scheme, but usually requires that the location of a noise source be known. However, the binary masking scheme may be used in the case of an omnidirectional noise environment or when there is no prior information about the location or characteristics of a noise source. However, the performance of the binary masking scheme depends on a threshold that is selected, and the optimal threshold depends on the location and strength of the noise source, which may not be known. Also, if the location and strength of the noise source is variable, the optimal threshold may vary over time.

Described below is a binary masking scheme in which the ITD, among the ITD, the IPD, and the IID, is set as a threshold. Generally, an appropriate ITD threshold may be selected from a set of potential ITD candidates. However, the optimum ITD threshold will depend on the number of noise sources and the location of the noise sources, and may vary over time. For example, when a direction of a sound from a noise source differs greatly from a direction of a sound from a target sound source, an ITD threshold encompassing a wider range of ITDs might provide better results. However, if such an ITD threshold encompassing a wider range of ITDs is used when the noise source is located very close to the target sound source, interference sound source signals as well as target sound source signals may be passed by the ITD threshold. This problem may become more complicated when there is more than one noise source and/or when a noise source moves.

Thus, as described below, two complementary masks employing a binary threshold may be used. When the two complementary masks are used, two different spectra may be obtained, i.e., a spectrum for a target sound source and a spectrum for an interference sound source. Short-time powers for the target sound source and the interference sound source may be obtained from the two spectra as short-time power sequences. A nonlinearity may be applied to the short-time power sequences. A correlation coefficient may be calculated from the power sequences with the applied nonlinearity, and an ITD threshold that minimizes the correlation coefficient may be selected.

A process of acquiring an ITD from phase information is described below. It is assumed that $x_L[n]$ and $x_R[n]$ denote signals received from a left microphone and a right microphone, respectively.

FIG. 1 shows an example of a left microphone 101, a right microphone 102, a target sound source 103, and an interference sound source 104. As shown in FIG. 1, the target sound source 101 is placed on a perpendicular bisector 105 between the two microphones, and the interference sound source is placed on a line 106 rotated by an angle θ from the perpendicular bisector 105 in the clockwise direction. The two microphones are separated by a distance Δ. The distance from the interference sound source 104 to the left microphone 101 is longer than the distance from the interference sound source 104 to the right microphone 102, which causes a sound from the interference sound source 104 to reach the right microphone 102 earlier than it reaches the left microphone 101, producing an interaural time difference (ITD) and an interaural phase difference (IPD). The difference between the distances from the interference sound source 104 to the left microphone 101 and the right microphone 102 is $\Delta \sin \theta$. Since the intensity of a sound diminishes with distance, this difference in distances causes the intensity of the sound at the right microphone 102 to be greater than the intensity of the sound at the left microphone 101, thereby producing an interaural intensity difference (IID). When a total number of interference sound sources is S, individual sound sources s have respective ITDs δ(s). Both S and δ(s) are typically unknown. With the above formulations, the signals received from the left microphone 101 and the right microphone 102, as denoted by $x_L[n]$ and $x_R[n]$, respectively, may be represented by the following Equation 1:

$$x_L[n] = x_0[n] + \sum_{s=1}^{S} x_s[n] \qquad (1)$$

$$x_R[n] = x_0[n] + \sum_{s=1}^{S} x_s[n - \delta(s)]$$

where $x_o[n]$ denotes a target signal, and $x_s[n]$ denotes signals received from each interference sound source s, where s ranges from 1 to S.

To perform spectral analysis, Equation 1 is multiplied by a Hamming window w[n] to obtain short-time signals represented by the following Equation 2:

$$x_L[n;m]=x_L[n-mL_{fp}]w[n]$$

$$x_R[n;m]=x_R[n-mL_{fp}]w[n]$$

$$\text{for } 0 \le n \le L_{fl}-1 \qquad (2)$$

where m denotes a frame index, $L_{fp}$ denotes a frame period, $L_{fl}$ denotes a frame length, and w[n] denotes a Hamming window having a length $L_{fl}$. The Hamming window is well known in the art, and thus will not be described in detail here. Additionally, n denotes a sample index in a digital signal, and $x_L[n;m]$ and $x_R[n;m]$ denote signals that are an n-th sample in an m-th frame among signals received through the left microphone 101 and the right microphone 102. In other words, since n and m have different characteristics, a semicolon is used instead of a comma to classify n and m.

Figure 2:
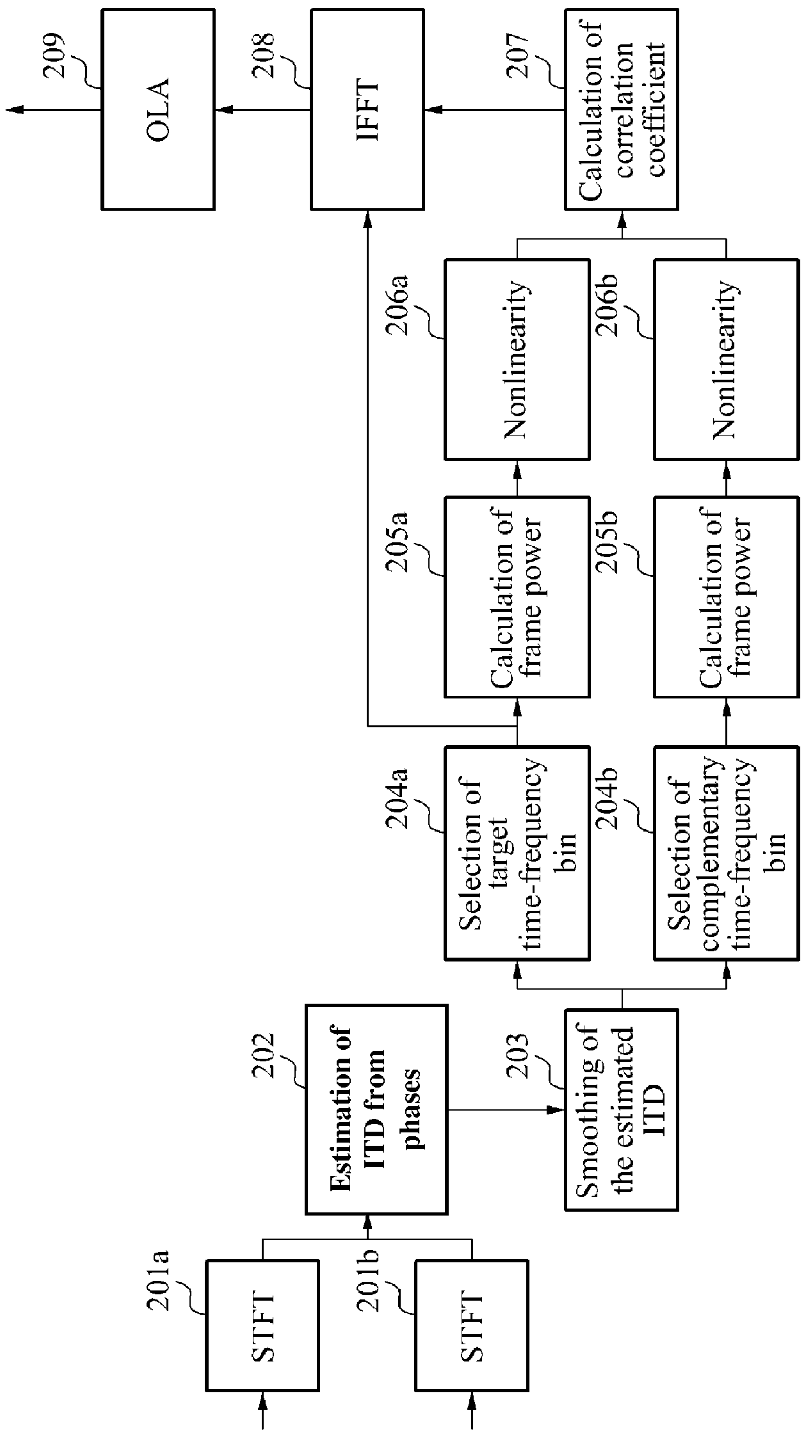
FIG. 2 shows an example of a process to select an optimum masking interaural time difference (ITD) threshold for sound source separation.

FIG. 2 shows an example of a process to select an optimum masking ITD threshold for sound source separation. In operations 201*a* and 201*b*, a short-time Fourier transform (STFT) is performed using the following Equation 3 on the short-time signals obtained using Equation 2 from the signals received from the left microphone 101 and the right microphone 102, which are represented by Equation 1. In other words, the STFT corresponding to Equation 1 may be represented by the following Equation 3:

$$X_L[m, e^{j\omega_k}) = \sum_{s=0}^{S} X_s[m, e^{j\omega_k}) \tag{3}$$

$$X_R[m, e^{j\omega_k}) = \sum_{s=0}^{S} e^{-j\omega_k d_s[m,k]} X_s[m, e^{j\omega_k})$$

where $\omega_k = 2\pi k/N$ ($0 \le \omega_k \le N/2-1$) denotes a Fast Fourier Transform (FFT) size, [m,k] denotes a specific time-frequency bin, and k denotes one of N frequency bins, with positive frequency samples corresponding to $\omega_k$. Additionally, in '$[m,e^{j\omega_k})$', '[' may indicate that m denotes a discrete signal, and ')' may indicate that $e^{j\omega_k}$ denotes a continuous signal.

Assuming that s*[m,k] is the strongest sound source for a specific time-frequency bin [m,k], the following Equation 4 may be derived from Equation 3:

$$X_L[m,e^{j\omega_k}) \approx X_{s^*[m,k]}[m,e^{-j\omega_k})$$

$$X_R[m,e^{j\omega_k}) \approx e^{-j\omega_k d_{s^*[m,k]}[m,k]} \times X_{s^*[m,k]}[m,e^{-j\omega_k}) \tag{4}$$

The strongest sound source s*[m,k] may be either 0, indicating a target sound source, or $1 \le s \le S$, indicating any of the interference sound sources.

In operation 202, from Equation 4, the ITD from the phases of the signals $X_L[m,e^{j\omega_k})$ and $X_R[m,e^{j\omega_k})$ for a particular time-frequency bin [m,k] is given by the following Equation 5:

$$|d_{s^*[m,k]}[m, k]| \approx \frac{1}{|\omega_k|}\min_r |\angle X_R[m, e^{-j\omega_k}) - \angle X_L[m, e^{-j\omega_k}) - 2\pi r| \tag{5}$$

where r denotes a smallest integer multiple.

Thus, based on whether the obtained ITD from Equation 5 is within a certain range of the target ITD (which is zero), determination is made on whether the time-frequency bin [m,k] is likely to belong to the target speaker or not.

In operation 203, the estimated ITD is smoothed. Smoothing over all frequency channels may be useful. The smoothing is well known in the art, and thus will not be described in detail here.

Next, two complementary binary masks may be obtained. One of the two complementary binary masks may identify time-frequency components that are believed to belong to the target signal, and the other may identify the components that are believed to belong to the interfering signals (i.e., everything except the target signal). The two complementary binary masks may be used to construct two different spectra corresponding to the power sequences representing the target and the interfering sources. A compressive nonlinearity may be applied to the power sequences, and the optimal ITD threshold may be defined as a threshold that minimizes the cross-correlation between these two output sequences (after the nonlinearity).

One element $\tau_0$ of a finite set T of potential ITD threshold candidates may be considered to be an optimum ITD threshold. This element $\tau_0$ may be used to obtain a target mask $\mu_T[m,k]$ and a complementary mask $\mu_I[m,k]$ as represented by the following Equation 6 for $0 \le k \le N/2$:

$$\mu_T[m, k] = \begin{cases} 1, & \text{if } |d[m, k]| \le \tau_0 \\ \eta, & \text{otherwise} \end{cases} \tag{6}$$

$$\mu_I[m, k] = \begin{cases} \eta, & \text{if } |d[m, k]| > \tau_0 \\ 1, & \text{otherwise} \end{cases}$$

For $N/2 \le k \le N-1$, a symmetry condition may be used as represented by the following Equation 7:

$$\mu_T[m,k] = \mu_T[m,N-k], N/2 \le k \le N-1$$

$$\mu_I[m,k] = \mu_I[m,N-k], N/2 \le k \le N-1 \tag{7}$$

In other words, only time-frequency bins having $|d[m,k]| \le \tau_0$ are considered to belong to a target sound source, and only time-frequency bins having $|d[m,k]| > \tau_0$ are considered to belong to a noise source.

In operations 204*a* and 204*b*, a target time-frequency bin and a complementary time-frequency bin are selected, respectively, using the masks described by Equations 6 and 7. For time-frequency bins belonging to the noise source, i.e., the interference sound source, the interference sound may be removed by multiplying the time-frequency bins by a value of 0. However, since an interference sound spectrum typically contains some portion of the target sound spectrum, a floor constant η having a very small value may be used to preserve the portion of the target sound spectrum in the interference sound spectrum. For example, a value of 0.01 may be used for the floor constant η, although other values may also be used. The target mask $\mu_T[m,k]$ and the complementary mask $\mu_I[m,k]$ described by Equations 6 and 7 are applied to $\overline{X}[m,e^{j\omega_k})$, which is an average signal spectrogram of the left and right channels. The average signal spectrogram may be represented by the following Equation 8:

$$\overline{X}[m, e^{j\omega_k}) = \frac{1}{2}\{X_L[m, e^{j\omega_k}) + X_R[m, e^{j\omega_k})\} \tag{8}$$

Using the procedure described above, a target spectrum $X_T[m,e^{j\omega_k}|\tau_0)$ and an interference spectrum $X_I[m,e^{j\omega_k}|\tau_0)$ may be represented by the following Equation 9:

$$X_T[m,e^{j\omega_k}|\tau_0) = \overline{X}[m,e^{j\omega_k})\mu_T[m,e^{j\omega_k})$$

$$X_I[m,e^{j\omega_k}|\tau_0) = \overline{X}[m,e^{j\omega_k})\mu_I[m,e^{j\omega_k}) \tag{9}$$

Equation 9 explicitly includes the ITD threshold $\tau_0$ to indicate that the target spectrum and the interference spectrum will depend on the ITD threshold $\tau_0$.

In operations 205*a* and 205*b*, frame powers of the target spectrum $X_T[m,e^{j\omega_k})$ and the interference spectrum $X_I[m,e^{j\omega_k})$ may be obtained as represented by the following Equation 10:

$$P_T[m \mid \tau_0) = \sum_{k=0}^{N-1} |X_T[m, e^{j\omega_k})|^2 \tag{10}$$

$$P_I[m \mid \tau_0) = \sum_{k=0}^{N-1} |X_I[m, e^{j\omega_k})|^2$$

where $P_T[m|\tau_0)$ denotes a power for the target signal, and $P_I[m|\tau_0)$ denotes a power for the interference signal.

In operations 206*a* and 206*b*, a nonlinearity is applied to each of the powers calculated in operations 205*a* and 205*b*. It is well known that the perceived loudness of a sound source is not proportional to the intensity of the sound source. Many nonlinearity models have been proposed to express a relationship between the perceived loudness and the intensity of the sound source. A logarithmic nonlinearity and a power-law nonlinearity are widely used as nonlinearity models. The results of applying the power-law nonlinearity to the powers calculated in operations 205*a* and 205*b* may be represented by the following Equation 11:

$$R_T[m|\tau_0)=P_T[m|\tau_0)^{\alpha_0}$$

$$R_I[m|\tau_0)=P_I[m|\tau_0)^{\alpha_0} \tag{11}$$

where $\alpha_0$ denotes a power coefficient and may have, for example, a value of 1/15.

In operation 207, a correlation coefficient is calculated from the results obtained using Equation 11. The correlation coefficient may be represented by the following Equation 12:

$$\rho_{T,I}(\tau_0) = \frac{\frac{1}{N}\sum_{m=1}^{M} R_T[m\mid\tau_0)R_I[m\mid\tau_0) - \mu_{R_T}\mu_{R_I}}{\sigma_{R_T}\sigma_{R_I}} \tag{12}$$

where $\sigma_{R_T}$ and $\sigma_{R_I}$ denote standard deviations of $R_T[m|\tau_0)$ and $R_I[m|\tau_0)$, respectively, and $\mu_{R_T}$ and $\mu_{R_I}$ denote averages of $R_T[m|\tau_0)$ and $R_I[m|\tau_0)$, respectively.

Then, the ITD threshold $\hat{\tau}_0$ that minimizes the correlation coefficient $\rho_{T,I}(\tau_0)$ expressed by Equation 12 is determined using the following Equation 13:

$$\hat{\tau}_0 = \underset{\tau_0}{\operatorname{argmin}}|\rho_{T,I}(\tau_0)| \tag{13}$$

In operation 208, an inverse fast Fourier transform (IFFT) is applied to a power per frequency unit using the target time-frequency bin selected in operation 204*a* and the ITD threshold $\hat{\tau}_0$ that minimizes the correlation coefficient obtained in operation 207 to generate a separated target signal that is substantially free of interference signals.

In operation 209, an overlap-addition (OLA) method is performed on the separated target signal obtained in operation 208 to enhance the quality of the separated target signal. The OLA method is well known in the art, and thus will not be described in detail here.

Figure 3:
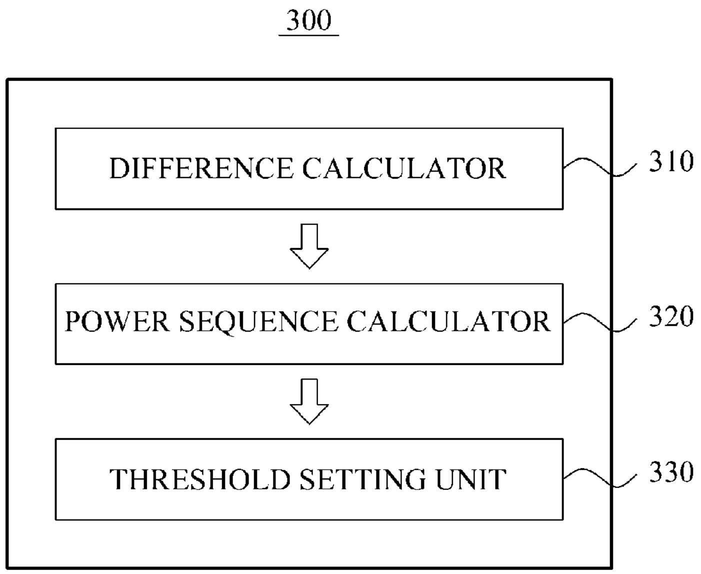
FIG. 3 shows an example of a signal separation system.

FIG. 3 shows an example of a signal separation system 300. In FIG. 3, the signal separation system 300 includes a difference calculator 310, a power sequence calculator 320, and a threshold setting unit 330.

The difference calculator 310 applies an STFT to each of a plurality of signals received from a plurality of microphones, and calculates at least one of three differences, an ITD, an IPD, and an IID. While an example of using the ITD has been described above with reference to FIGS. 1 and 2, a threshold for noise masking may be automatically set based on a noise environment using the IPD, or the IID, or any two of the ITD, the IPD, and the IID, or all three of the ITD, the IPD, and the IID. An example of obtaining an ITD using Equation 5 has been described above. The IPD or the IID may also be applied to the examples in a similar manner to the ITD. The examples relate to how to use the calculated difference to set an optimum threshold, and thus how to obtain the IPD or the IID will not be described in detail here.

The power sequence calculator 320 calculates two power sequences from the received signals, one for a target signal and the other for an interference signal, using a target mask and a complementary mask. The target mask and the complementary mask are generated based on the difference calculated by the difference calculator 310. For example, a power for the target signal and a power for the interference signal are calculated based on the ITD using Equation 10 as described above. Each of the target mask and the complementary mask may be a binary mask or a continuous mask.

The threshold setting unit 330 sets a threshold for noise masking so that a correlation coefficient has a minimum value. The correlation coefficient is calculated after applying a nonlinearity to the two power sequences. Specifically, the correlation coefficient is calculated from the two power sequences to which the nonlinearity is applied, and the difference calculated by the difference calculator 310. A difference that minimizes the correlation coefficient is set as a threshold by the threshold setting unit 330. The nonlinearity may be a logarithmic nonlinearity or a power-law nonlinearity. For example, using Equations 11 to 13 described above, the power-law nonlinearity may be applied to the two power sequences and an ITD may then be determined so that the correlation coefficient has a minimum value. The determined ITD is set as the optimum threshold for noise masking. After setting the optimum threshold in an initial sound period, whether to use the optimum threshold in a sound period subsequent to the initial sound period may be determined, or a search range may be changed, based on a variation pattern of the threshold since there is no radical change in a threshold for masking.

Figure 4:
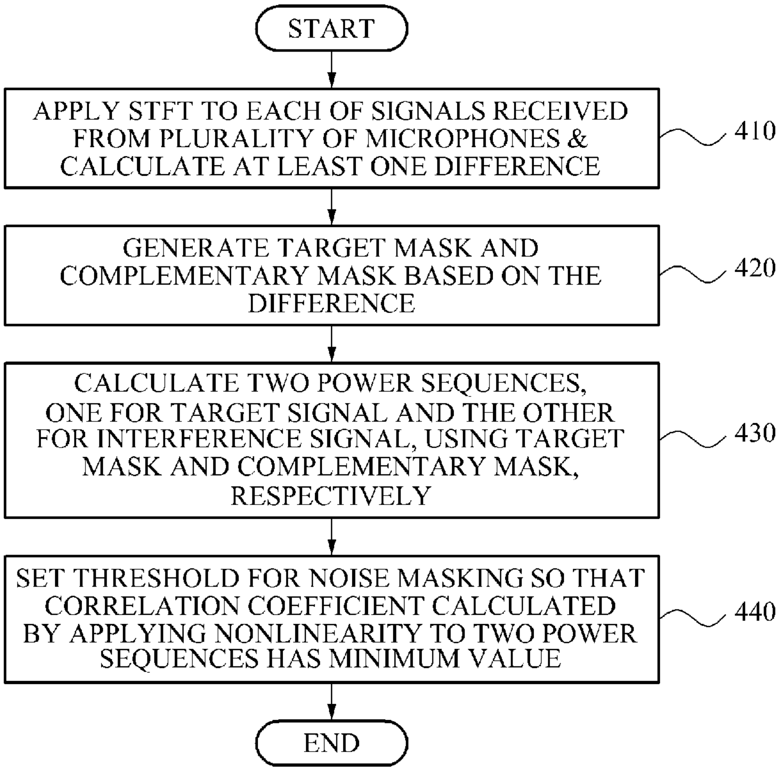
FIG. 4 shows an example of a signal separation method.

FIG. 4 shows an example of a signal separation method. The signal separation method of FIG. 4 may be performed by the signal separation system 300 of FIG. 3. The signal separation method is described below with reference to FIG. 4.

In operation 410, the signal separation system 300 applies the STFT to each of a plurality of signals received from a plurality of microphones, and calculates at least one of three differences, an ITD, an IPD, and an IID. The operation of obtaining the ITD using Equation 5 has been described above, and thus will not be described in detail here.

In operation 420, the signal separation system 300 generates a target mask and a complementary mask based on the difference calculated in operation 410. Each of the target mask and the complementary mask may be a binary mask or a continuous mask.

In operation 430, the signal separation system 300 calculates two power sequences, one for a target signal and the other for an interference signal, using the target mask and the complementary mask, respectively, with respect to the received signals. The target mask and the complementary mask are generated based on the difference calculated in operation 410. For example, a power for the target signal and a power for the interference signal may be calculated based on the ITD using Equation 10 as described above.

In operation 440, the signal separation system 300 sets a threshold for noise masking so that a correlation coefficient has a minimum value. The correlation coefficient is calculated after applying a nonlinearity to the two power sequences. Specifically, the correlation coefficient is calculated based on the two power sequences to which the nonlinearity is applied, and the difference calculated in operation 410. A difference that minimizes the correlation coefficient is set as a threshold by the signal separation system 300. The nonlinearity may be a logarithmic nonlinearity or a power-law nonlinearity. For example, using Equations 11 to 13 described above, the power-law nonlinearity may be applied to the two power sequences and an ITD may then be determined so that the correlation coefficient has a minimum value. The determined ITD is set as the optimum threshold for noise masking. After setting the optimum threshold in an initial sound period, whether to use the optimum threshold in a sound period subsequent to the initial sound period may be determined, or a search range may be changed, based on a variation pattern of the threshold since there is no significant change in a threshold for masking.

Figure 5:
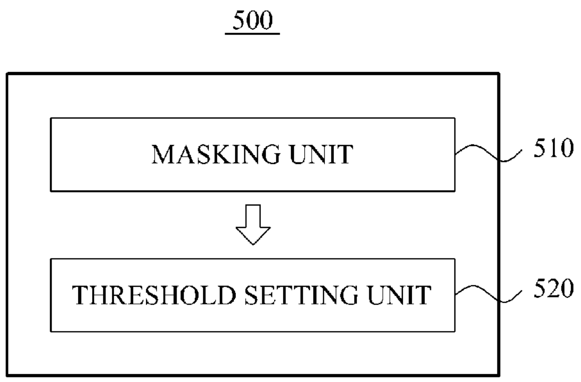
FIG. 5 shows an example of a signal separation system.

FIG. 5 shows an example of a signal separation system 500. In FIG. 5, the signal separation system 500 includes a masking unit 510 and a threshold setting unit 520.

The masking unit 510 individually masks signals received from a plurality of microphones using a target mask and a complementary mask. Each of the target mask and the complementary mask may be a binary mask or a continuous mask. The target mask and the complementary mask have been described above in detail with reference to Equations 6 and 7, and thus will not be described in detail here.

The threshold setting unit 520 sets a threshold for noise masking so that a correlation between the masked signals is minimized. Specifically, the signals received from the plurality of microphones may be masked with the target mask and the complementary mask to obtain a signal for a target signal and a signal for an interference signal, respectively. Subsequently, a threshold that minimizes a correlation between the two signals may be set for noise masking. For example, the threshold setting unit 520 may set the threshold so that a correlation coefficient calculated after applying a nonlinearity to each of the masked signals has a minimum value. Alternatively, the threshold setting unit 520 may set a threshold that minimizes mutual information between the two signals to perform noise masking. Here, the mutual information pertains to a statistical ratio of a probability of an independent occurrence of two factors to a probability of a simultaneous occurrence of two factors. In other words, the threshold for minimizing the mutual information may refer to a threshold for minimizing a ratio indicating a mutual dependency between the two signals.

Figure 6:
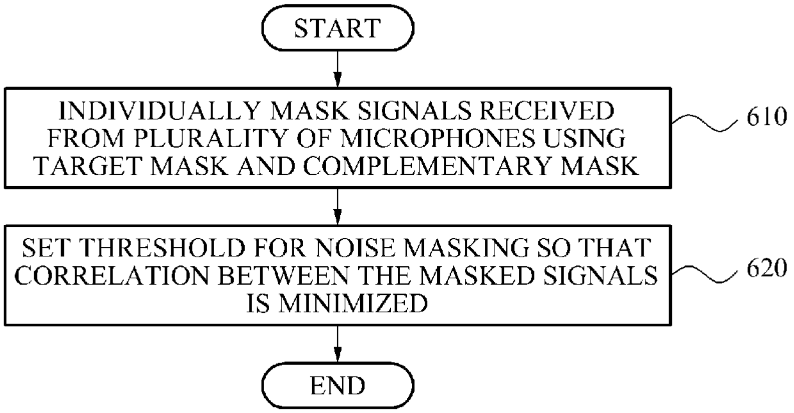
FIG. 6 shows an example of a signal separation method.

FIG. 6 shows an example of a signal separation method. The signal separation method of FIG. 6 may be performed by the signal separation system 500 of FIG. 5. The signal separation method is described below with reference to FIG. 6.

In operation 610, the signal separation system 500 individually masks signals received from a plurality of microphones using a target mask and a complementary mask. Each of the target mask and the complementary mask may be a binary mask or a continuous mask. The target mask and the complementary mask have been described above in detail with reference to Equations 6 and 7, and thus will not be described in detail here.

In operation 620, the signal separation system 500 sets a threshold for noise masking so that a correlation between the masked signals is minimized. Specifically, the signals received from the plurality of microphones are masked with the target mask and the complementary mask to obtain a signal for a target signal and a signal for an interference signal, respectively. Subsequently, a threshold that minimizes a correlation between the two signals may be set for noise masking. For example, the signal separation system 500 may set the threshold so that a correlation coefficient calculated after applying a nonlinearity to each of the masked signals may have a minimum value. Alternatively, the signal separation system 500 may set a threshold that minimizes mutual information between the two signals to perform noise masking. Here, the mutual information pertains to a statistical ratio of a probability of an independent occurrence of two factors to a probability of a simultaneous occurrence of two factors. In other words, the threshold for minimizing the mutual information may refer to a threshold for minimizing a ratio indicating a mutual dependency between the two signals.

According to the examples described above, in the signal separation system and the signal separation method based on a plurality of microphones, a threshold for noise masking may be automatically set based on a noise environment, and thus it is possible to adaptively respond to a change in the environment in which the system and method are used.

The signal separation methods described above may be recorded, stored, or fixed in one or more non-transitory computer-readable storage medium that includes program instructions to be implemented by a computer to cause a processor to execute or perform the program instructions. The non-transitory computer-readable storage medium may also include, alone or in combination with the program instructions, data files, data structures, and the like. The non-transitory computer-readable storage medium and program instructions may be those specially designed and constructed, or they may be of the kind that are well known and available to those having skill in the computer software arts. Examples of a non-transitory computer-readable storage medium include magnetic media, such as hard disks, floppy disks, and magnetic tapes; optical media, such as CD-ROM/±R/±RW, DVD-ROM/RAM/±R/±RW, and BD (Blu-ray)-ROM/−R/−RW; magneto-optical media; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network, and computer-readable codes or program instructions may be stored and executed in a decentralized manner.

Several examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the claims and their equivalents.

What is claimed is:

1. A signal separation system comprising:

a power sequence calculator to calculate a power sequence for a target signal using a target mask, and a power sequence for an interference signal using a complementary mask, based on signals received from a plurality of microphones; and a threshold setting unit to:

apply a nonlinearity to the target signal power sequence and the interference signal power sequence;

calculate a correlation coefficient of the nonlinear target signal power sequence and the nonlinear interference signal power sequence; and set a noise masking threshold that minimizes the correlation coefficient.

2. The signal separation system of claim 1, wherein the power sequence calculator generates the target mask and the complementary mask based on at least one difference selected from an interaural time difference (ITD) of the received signals, an interaural phase difference (IPD) of the received signals, and an interaural intensity difference (IID) of the received signals.

3. The signal separation system of claim 2, further comprising a difference calculator to:

apply a short-time Fourier transform (STFT) to each of the received signals; and calculate the at least one difference based on the STFT-transformed signals.

4. The signal separation system of claim 1, wherein the threshold setting unit calculates the correlation coefficient based on the nonlinear target signal power sequence, the nonlinear interference signal power sequence, and at least one difference selected from an interaural time difference (ITD) of the received signals, an interaural phase difference (IPD) of the received signals, and an interaural intensity difference (IID) of the received signals.

5. The signal separation system of claim 4, wherein the threshold setting unit sets the at least one difference as the noise masking threshold that minimizes the correlation coefficient.

6. The signal separation system of claim 1, wherein the nonlinearity is a logarithmic nonlinearity or a power-law nonlinearity.

7. The signal separation system of claim 1, wherein the target mask and the complementary mask are each a binary mask or a continuous mask.

8. A signal separation system comprising:

a masking unit to individually mask signals received from a plurality of microphones using a target mask and a complementary mask; and a threshold setting unit to set a noise masking threshold that minimizes a correlation between the masked signals.

9. The signal separation system of claim 8, wherein the threshold setting unit:

applies a nonlinearity to each of the masked signals;

calculates a correlation coefficient of the nonlinear masked signals; and sets the noise masking threshold so that the correlation coefficient has a minimum value.

10. A signal separation method in a signal separation system, the method comprising:

calculating a power sequence for a target signal using a target mask, and a power sequence for an interference signal using a complementary mask, based on signals received from a plurality of microphones;

applying a nonlinearity to the target signal power sequence and the interference signal power sequence;

calculating a correlation coefficient of the nonlinear target signal power sequence and the nonlinear interference signal power sequence; and setting a noise masking threshold that minimizes the correlation coefficient.

11. The method of claim 10, wherein the calculating of the power sequences comprises generating the target mask and the complementary mask based on at least one difference selected from an interaural time difference (ITD) of the received signals, an interaural phase difference (IPD) of the received signals, and an interaural intensity difference (IID) of the received signals.

12. The method of claim 11, further comprising:

applying a short-time Fourier transform (STFT) to each of the received signals; and calculating the at least one difference based on the STFT-transformed signals.

13. The method of claim 10, wherein the calculating of the correlation coefficient comprises calculating the correlation coefficient based on the nonlinear target signal power sequence, the nonlinear interference signal power sequence, and at least one difference selected from an interaural time difference (ITD) of the received signals, an interaural phase difference (IPD) of the received signals, and an interaural intensity difference (IID) of the received signals.

14. The method of claim 13, wherein the setting of the noise masking threshold comprises setting the at least one difference as the noise masking threshold that minimizes the correlation coefficient.

15. A non-transitory computer-readable medium storing a program for controlling a computer to implement the method of claim 10.

16. A signal separation method in a signal separation system, the method comprising:

individually masking signals received from a plurality of microphones using a target mask and a complementary mask; and setting a noise masking threshold that minimizes a correlation between the masked signals.

17. The method of claim 16, wherein the setting comprises:

applying a nonlinearity to each of the masked signals;

calculating a correlation coefficient of the nonlinear masked signals; and setting the noise masking threshold so that the correlation coefficient has a minimum value.

18. A non-transitory computer-readable recording medium storing a program for controlling a computer to implement the method of claim 16.

19. A signal separation system comprising:

a masked spectrum generator to generate a masked target signal spectrum and a masked interference signal spectrum from signals received from a plurality of microphones using a target mask and a complementary mask; and a threshold setting unit to set a threshold of the target mask and the complementary mask based on a difference between the received signals so that the threshold minimizes a correlation between a nonlinearized target power sequence of the masked target signal spectrum and a nonlinearized interference power sequence of the masked interference signal spectrum.

20. The signal separation system of claim 19, further comprising a separated target signal generator to generate a separated target signal substantially free of interference signals from the masked target signal spectrum and the threshold set by the threshold setting unit.

21. The signal separation system of claim 19, wherein the difference is an interaural time difference (ITD).

22. The signal separation system of claim 19, wherein the target mask and the complementary mask are each a binary mask.

23. The signal separation system of claim 22, wherein the target mask has a value of 1 if the difference is less than or equal to the threshold, and a value of $\eta$ if the difference is greater than the threshold; and the complementary mask has a value of $\eta$ if the difference is greater than the threshold, and a value of 1 if the difference is less than or equal to the threshold.

24. The signal separation system of claim 23, wherein the value of $\eta$ represents a portion of an interference signal spectrum that is actually a portion of a target signal spectrum.

25. The signal separation system of claim 24, wherein $\eta=0.01$.

26. A signal separation method in a signal separation system, the method comprising:

generating a masked target signal spectrum and a masked interference signal spectrum from signals received from a plurality of microphones using a target mask and a complementary mask; and setting a threshold of the target mask and the complementary mask based on a difference between the received signals so that the threshold minimizes a correlation between a nonlinearized target power sequence of the masked target signal spectrum and a nonlinearized interference power sequence of the masked interference signal spectrum.

27. The method of claim 26, further comprising generating a separated target signal substantially free of interference signals from the masked target signal spectrum and the threshold set by the threshold setting unit.

28. The method of claim 26, wherein the difference is an interaural time difference (ITD).

29. The method of claim 26, wherein the target mask and the complementary mask are each a binary mask.

30. The method of claim 29, wherein the target mask has a value of 1 if the difference is less than or equal to the threshold, and a value of $\eta$ if the difference is greater than the threshold; and the complementary mask has a value of $\eta$ if the difference is greater than the threshold, and a value of 1 if the difference is less than or equal to the threshold.

31. The method of claim 30, wherein the value of $\eta$ represents a portion of an interference signal spectrum that is actually a portion of a target signal spectrum.

32. The method of claim 31, wherein $\eta$=0.01.

* * * * *